3,439,955
ELASTIC STUB-AXLE SYSTEMS OF WHEELS
Jean G. Cadiou, Paris, France, assignor to Societe Anonyme Andre Citroen, Paris, France, a French company
Filed Dec. 6, 1966, Ser. No. 599,485
Claims priority, application France, Dec. 9, 1965, 41,553
Int. Cl. B62d 7/00, 9/00; B60g 25/00
U.S. Cl. 301—133                                             6 Claims

ABSTRACT OF THE DISCLOSURE

The stub axle of a non-driven wheel of a vehicle is supported by an elastic socket and a vertically mounted flexible blade, parallel to the stub axle, interposed between the stub axle and a wheel support. The elastic socket elastically transmits reactions in a direction longitudinal of the vehicle and the flexible blade has elasticity in a longitudinal direction while transmitting vertical reactions directly from one member to the other.

---

The present invention relates to an elastic stub-axle system for the non-driven wheels of a vehicle, which is designed to constitute a longitudinal-elasticity suspension of the wheel, the vehicle load being transmitted directly from the axle arm to the wheel; on the other hand, the vertical reactions are transmitted directly from the wheel to the axle arm, the horizontal reactions from the wheel to the axle arm and vice versa being transmitted elastically.

To this end, the stub-axle system according to the present invention is characterized in that there are interposed between the hub proper or stub-axle bearing and the wheel support on the one hand a resilient socket transmitting elastically the longitudinal reactions from one member to the other member, and on the other hand a flexible blade (or a leaf-spring assembly) mounted vertically and transversely in a direction parallel to the hub axis so as to have a longitudinal elasticity and thus permit the transmission of longitudinal reactions while transmitting directly the vertical reactions from one member to the other.

In order to afford a clearer understanding of this invention and of the manner in which the same may be carried out in practice, reference will now be made to the accompanying drawings illustrating diagrammatically by way of example two typical forms of embodiment of the stub-axle system according to this invention. In the drawings.

Figure 1:
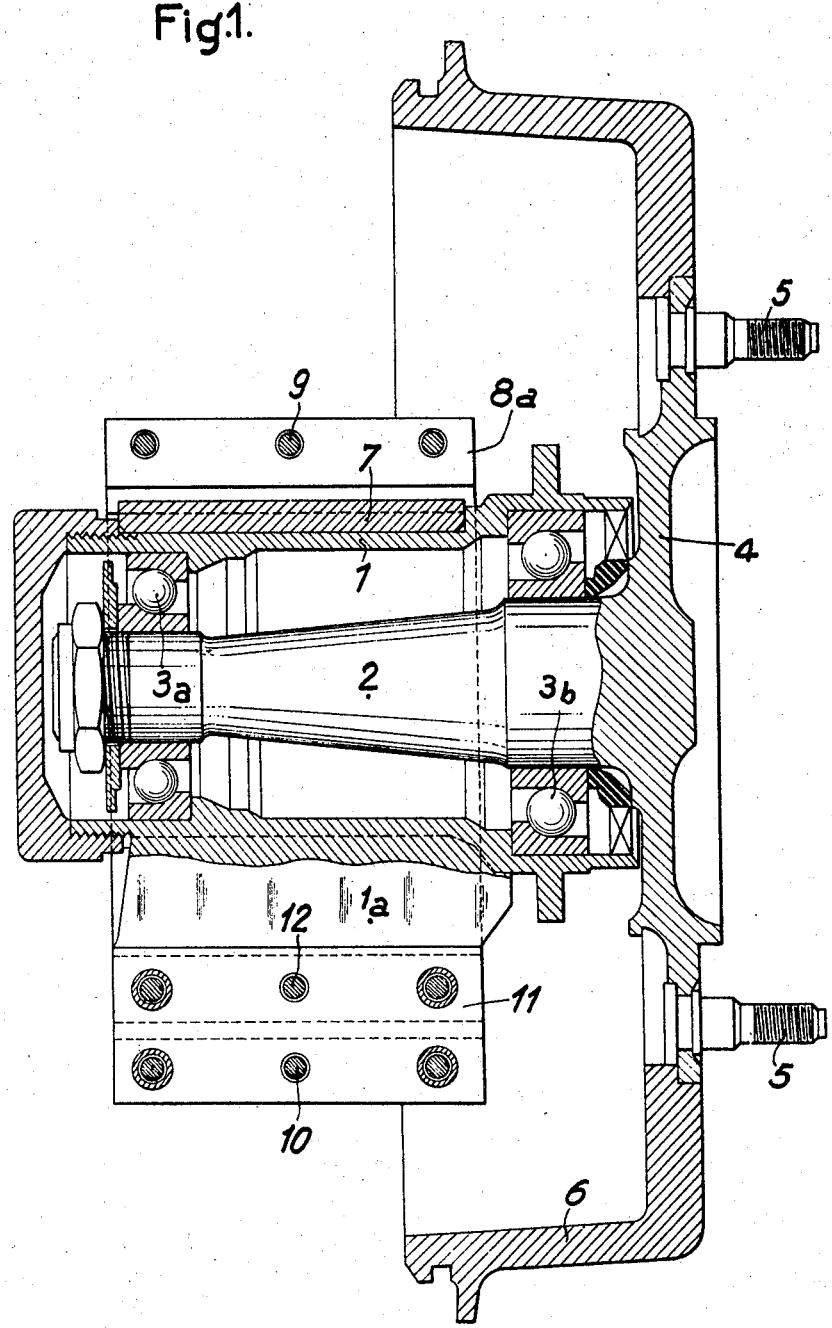
FIGURE 1 is a longitudinal axial section taken across the wheel hub.
Figure 2:
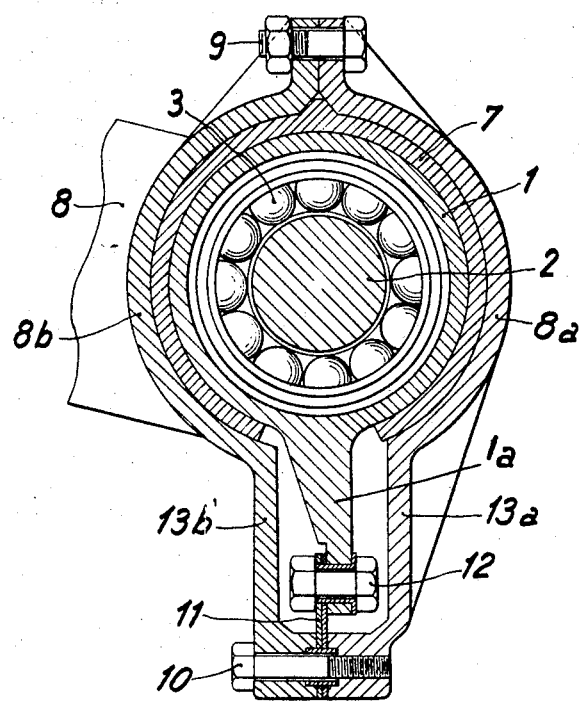
FIGURE 2 is a cross-sectional view.

Referring firstly to the form of embodiment of the invention which is illustrated in FIGURES 1 and 2 of the drawings, the wheel hub or stub-axle bearing consists of a socket 1 supporting in the conventional manner the stub-axle 2 by means of ball-bearings 3a and 3b; this stub-axle is rigid with the flange 4 carrying the studs 5 for securing the wheel and the brake drum or disk 6; the hub is mounted with the interposition of an elastic socket 7 between two sections 8a and 8b of the wheel support arm 8 secured in turn by means of bolts 9 and 10.

A flexible blade 11 parallel to the wheel axis and consisting in this example of a double leaf spring is secured on the one hand to the hub extension 1a by means of bolts 12 and on the other hand by being clamped between extensions 13a and 13b of said sections 8a and 8b of the wheel supporting arm in which the hub 1 is mounted, these extensions being secured in turn by the aforesaid bolts 10.

This blade 11 is adapted to support the wheel load in order to relieve the elastic socket 7 from any stress resulting from this wheel load; on the other hand, the longitudinal reactions are transmitted from the road surface to the wheel and to the hub so as to be resiliently absorbed or damped out by the elastic socket 7, the elastic supporting blade 11 permitting the relative oscillation of the hub 1 and wheel support 8.

Figure 4:
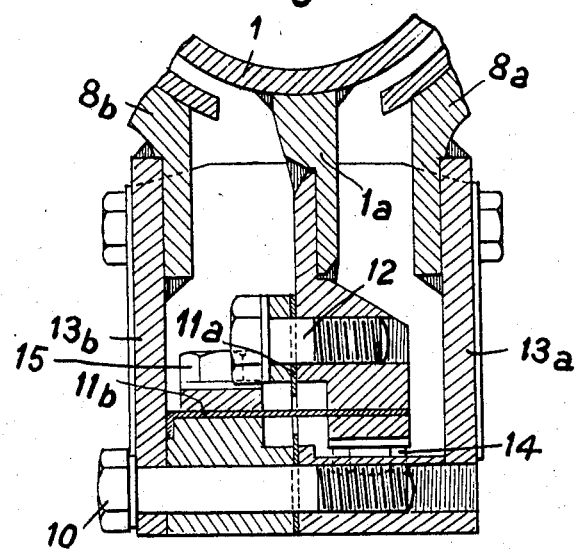
FIGURES 3 and 4 are similar views showing the lower portion of a stub-axle system according to a modified form of embodiment of this invention.
Figure 3:
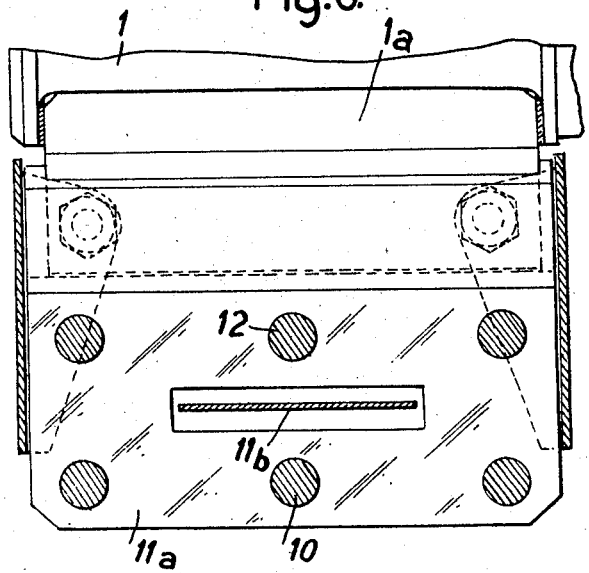

Thus, notably, the flexible blade 11 may be replaced by a pair of flexible blades mounted for example at right angles to each other; thus, in the exemplary form of embodiment illustrated in FIGURES 3 and 4 of the drawings, the flexible blade 11a comprises a transverse slot in its central portion through which another flexible blade 11b extending at right angles to the former and parallel to the axis of stub-axle 2 is inserted; the ends of this other flexible blades 11b are secured, like those of the first blade 11a, the one to the extension 1a directed towards the hub arm 1 by means of bolts 14, and the other to the extensions 13a and 13b of the wheel supporting member 8 by means of bolts 15; thus, at the intersection of the blades 11a and 11b, which are not compulsorily perpendicular to each other, a fixed imaginary axis is obtained with respect to the arm 8; the assembly will thus constitute a rigid, frictionless pivotal mounting of the blade 11a about the fictitious axis, wherein only blade 11 of FIGURES 1 and 2 is allowed to warp by assuming an inclination in the vertical plane with respect to its mean plane, in which the blade 11b is disposed; of course, the imbrication of blades 11a and 11b may differ from the one described hereinabove and illustrated in FIGURES 3 and 4 of the drawings; similarly, the angular relationship of these two blades may also differ.

What I claim is:

1. Stub-axle system of a non-driven wheel of a vehicle, designed with a view to constitute a wheel suspension having elasticity in a direction longitudinal of the vehicle, comprising a wheel hub and a wheel support in which are interposed between the wheel hub and the wheel support on the one hand an elastic socket adapted to elastically transmit the reactions parallel to the longitudinal axis of the vehicle from the hub to the support or vice versa, and on the other hand a flexible blade mounted vertically and transversely, parallel to the hub axis, by which said support carries said hub so as to have a longitudinal elasticity and permit the longitudinal reactions while transmitting directly the vertical reactions from said hub to said support or vice versa.

2. Wheel stub-axle system as set forth in claim 1, in which said flexible blade is mounted entirely the hub between the lower portion thereof and the lower portion of the wheel support.

3. Wheel stub-axle system as set forth in claim 1, in which the wheel hub has a downward extension and the lower part of the wheel support has an extension divided in two sections, and the upper portion of the flexible blade is secured to the downward extension of the wheel hub and its lower portion is clamped between the two sections of the wheel support.

4. Wheel stub-axle system as set forth in claim 3, in which another blade parallel to the axis of said wheel hub and inclined with respect to the first flexible blade maintains same.

5. Wheel stub-axle system as set forth in claim 4, in which the first flexible blade comprises in its central portion a transverse slot, the second flexible blade is engaged through said transverse slot and the ends of said second blade are secured, as those of the first blade, the one to the downward extension of the wheel hub, and the other to an extension of the wheel support.

6. Wheel stub-axle system as set forth in claim 1, in which said flexible blade comprises a multiple leaf spring.

References Cited

UNITED STATES PATENTS

| 1,247,748 | 11/1917 | Trott | 267—41 X |
| 1,386,855 | 8/1921 | Ewing | 301—133 |
| 1,389,826 | 9/1921 | Goersch | 301—136 |
| 3,307,856 | 3/1967 | Christian | 301—136 X |

RICHARD J. JOHNSON, *Primary Examiner.*

U.S. Cl. X.R.

267—41; 301—126; 280—124